(12) United States Patent
Chen et al.

(10) Patent No.: US 10,759,148 B2
(45) Date of Patent: Sep. 1, 2020

(54) WOOD ADHESIVE, METHOD FOR ADHERING WOOD MATERIALS USING THE SAME, AND COMPOSITE WOOD STRUCTURE USING THE SAME

(71) Applicant: INDUSTRIAL TECHNOLOGY RESEARCH INSTITUTE, Hsinchu (TW)

(72) Inventors: Man-Lin Chen, Miaoli County (TW); Hsien-Kuang Lin, Hsinchu (TW); Sue-May Chen, Taipei (TW); Su-Huey Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 148 days.

(21) Appl. No.: 16/059,539

(22) Filed: Aug. 9, 2018

(65) Prior Publication Data

US 2018/0345632 A1 Dec. 6, 2018

Related U.S. Application Data

(62) Division of application No. 14/509,746, filed on Oct. 8, 2014, now abandoned.

(60) Provisional application No. 61/940,862, filed on Feb. 18, 2014.

(30) Foreign Application Priority Data

May 8, 2014 (TW) .............................. 103116383 A

(51) Int. Cl.
| | | |
|---|---|---|
| B32B 21/04 | (2006.01) | |
| B32B 7/12 | (2006.01) | |
| B32B 23/04 | (2006.01) | |
| B32B 7/00 | (2019.01) | |
| B32B 21/00 | (2006.01) | |
| B32B 21/02 | (2006.01) | |
| B32B 23/00 | (2006.01) | |
| B32B 23/14 | (2006.01) | |
| C09J 101/28 | (2006.01) | |
| C08G 73/02 | (2006.01) | |
| C09J 179/02 | (2006.01) | |
| C08L 1/28 | (2006.01) | |

(52) U.S. Cl.
CPC .............. *B32B 21/042* (2013.01); *B32B 7/00* (2013.01); *B32B 7/12* (2013.01); *B32B 21/00* (2013.01); *B32B 21/02* (2013.01); *B32B 21/04* (2013.01); *B32B 23/00* (2013.01); *B32B 23/04* (2013.01); *B32B 23/044* (2013.01); *B32B 23/14* (2013.01); *C08G 73/0286* (2013.01); *C08G 73/0293* (2013.01); *C08L 1/286* (2013.01); *C09J 101/286* (2013.01); *C09J 179/02* (2013.01); *Y10T 428/31515* (2015.04)

(58) Field of Classification Search
CPC .................................................... B32B 21/042
See application file for complete search history.

(56) References Cited

U.S. PATENT DOCUMENTS

| | | | |
|---|---|---|---|
| 3,931,088 A | 1/1976 | Sakurada et al. | |
| 6,359,040 B1* | 3/2002 | Burdick | ................ D21H 21/14 524/43 |
| 6,585,997 B2* | 7/2003 | Moro | ........................ A61P 5/00 424/434 |
| 6,960,617 B2 | 11/2005 | Omidian et al. | |
| 7,060,798 B2 | 6/2006 | Li et al. | |
| 7,179,528 B2 | 2/2007 | Suzuki et al. | |
| 7,252,735 B2 | 8/2007 | Li | |
| 7,265,169 B2 | 9/2007 | Li et al. | |
| 7,393,930 B2 | 7/2008 | Li et al. | |
| 7,416,598 B2 | 8/2008 | Sun et al. | |
| 7,722,712 B2 | 5/2010 | Li | |
| 7,736,559 B2* | 6/2010 | Rivers | ..................... C08L 97/02 156/330 |
| 7,785,440 B2 | 8/2010 | Li | |
| 8,728,047 B2 | 5/2014 | Ciok | |
| 2011/0293932 A1 | 12/2011 | Jiang et al. | |
| 2012/0115992 A1 | 5/2012 | Khabbaz et al. | |
| 2012/0183794 A1 | 7/2012 | Guo et al. | |
| 2015/0232724 A1 | 8/2015 | Chen et al. | |

FOREIGN PATENT DOCUMENTS

| | | |
|---|---|---|
| CN | 1300309 A | 6/2001 |
| CN | 100503761 C | 6/2009 |
| CN | 101497772 | 8/2009 |

(Continued)

OTHER PUBLICATIONS

Han et al., "Technical Manual for Producing Fine Organic Chemical Products," China Petrochemical Press, pp. 1659-1662, Jun. 2010.
"Aqualon Sodium Carboxymethylcellulose Physical and Chemical Properties", Hercules, Apr. 2002, 32 pages.
Jang et al., "A new formalde hyde-free wood adhesive from renewable materials", International Journal of Adhesion & Adhesives, 2011, No. 31, pp. 754-759.
Imam et al., "Environmentally friendly wood adhesive from a renewable plant polymer: characteristics and optimization", Polymer Degradation and Stability, 2001, No. 73, pp. 529-533.
Imam et al., "Wood Adhesive from Crosslinked Poly(Vinyl Alcohol) and Partially Gelatinized Starch: Preparation and Properties", Starch/Starke, 1999, No. 51, pp. 225-229.

(Continued)

*Primary Examiner* — Daniel H Lee
(74) *Attorney, Agent, or Firm* — Muncy, Geissler, Olds & Lowe, P.C.

(57) ABSTRACT

A wood adhesive, a method for adhering wood materials using the same, and a composite wood structure using the same are disclosed. The wood adhesive comprises a first agent and a second agent, wherein the first agent comprises sodium carboxymethyl cellulose having a molecular weight from about 15,000 to about 500,000 and a degree of substitution from about 0.4 to about 2, and the second agent comprises polymeric quaternary amine.

10 Claims, No Drawings

(56) References Cited

FOREIGN PATENT DOCUMENTS

| CN | 103153563 A | 6/2013 |
| CN | 104479596 A | 4/2015 |
| EP | 1 180 559 A1 | 2/2002 |
| JP | S555937 A | 1/1980 |
| JP | 2007131747 A | 5/2007 |
| JP | 2008189839 A | 8/2008 |
| TW | 200829655 | 7/2008 |
| TW | I319426 B | 1/2010 |
| TW | 201533186 A | 9/2015 |
| WO | WO2008/024444 A3 | 2/2008 |
| WO | WO2011/009812 A1 | 1/2011 |

OTHER PUBLICATIONS

Liu et al., "Modification of Soy Protein for Wood Adhesives using Mussel Protein as a Model: The Influence of a Mercapto Group", Macromol. Rapid Commun, 2004, No. 25, pp. 1835-1838.

Essawy et al., "Improving the Performance of Urea-Formaldehyde Wood Adhesive System Using Dendritic Poly(amidoamine)s and their Corresponding Half Generations", Journal of Applied Polymer Science, 2009, vol. 114, pp. 1348-1355.

Kaichang Li et al, "Formaldehyde-Free Wood Adhesives from Decayed Wood" *Macromolecular Rapid Communications*, Nov. 30, 2004 pp. 529-532, vol. 2005-26.

A. Despres, et al, "Formaldehyde-Free Aminoresin Wood Adhesives Based on Dimethoxyethanal" *Journal of Applied Polymer Science*, Sep. 19, 2008 pp. 3908-3916,vol. 110.

* cited by examiner

WOOD ADHESIVE, METHOD FOR ADHERING WOOD MATERIALS USING THE SAME, AND COMPOSITE WOOD STRUCTURE USING THE SAME

This application is a divisional application of U.S. application Ser. No. 14/509,746, filed on Oct. 8, 2014, which claims the benefit of U.S. provisional application Ser. No. 61/940,862, filed on Feb. 18, 2014, and Taiwan application Serial No. 103116383, filed on May 8, 2014. The entire contents of the related applications are incorporated herein by reference.

TECHNICAL FIELD

The disclosure relates to an adhesive, a method for adhering materials using the same, and a composite structure using the same. More particularly, the disclosure relates to a wood adhesive, a method for adhering wood materials using the same, and a composite wood structure using the same.

BACKGROUND

Wood adhesive is the most widely used adhesive, and its consumption is more than half of the total consumption of the adhesives. Over 80% of the wood adhesive comprises at least one of urea-formaldehyde resin and phenolic-formaldehyde resin as the main agent. However, such resins will release formaldehyde for up to even over ten years due to their curing mechanism, thus cause pollution and health damage. As such, it is the trend of times to solving the formaldehyde release and pollution problem of the wood adhesive.

SUMMARY

In this disclosure, a wood adhesive using a biomass material is provided. The biomass material to be used is cellulose derivative. In this disclosure, a method for adhering wood materials using the wood adhesive and a composite wood structure using the wood adhesive are also provided.

According to some embodiments, the wood adhesive comprises a first agent and a second agent. The first agent comprises sodium carboxymethyl cellulose having a molecular weight from about 15,000 to about 500,000 and a degree of substitution from about 0.4 to about 2. The second agent comprises polymeric quaternary amine.

According to some embodiments, the method for adhering wood materials comprises the following steps. At first, a first wood block and a second wood block are provided. Then, the first wood block is bonded with the second wood block by a wood adhesive, wherein the wood adhesive comprises a first agent and a second agent, the first agent comprises sodium carboxymethyl cellulose having a molecular weight from about 15,000 to about 500,000 and a degree of substitution from about 0.4 to about 2, and the second agent comprises polymeric quaternary amine.

According to some embodiments, the composite wood structure comprises a first wood block, a second wood block and an adhesion layer. The adhesion layer bonds the first wood block with the second wood block. The adhesion layer is formed by mixing a first agent and a second agent of a wood adhesive and curing the wood adhesive, wherein the first agent of the wood adhesive comprises sodium carboxymethyl cellulose having a molecular weight from about 15,000 to about 500,000 and a degree of substitution from about 0.4 to about 2, and the second agent of the wood adhesive comprises polymeric quaternary amine.

BRIEF DESCRIPTION OF THE DRAWINGS

None.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

DETAILED DESCRIPTION

In this disclosure, a wood adhesive using a cellulose derivative is provided. The cellulose derivative has a structure as shown in Chemical Formula 1, wherein R is H or $CH_2CO_2Na$, n is an integer.

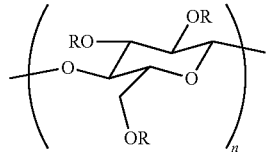

[Chemical Formula 1]

According to some embodiments, the wood adhesive comprises a first agent and a second agent. The first agent and the second agent may be stored separately, and not be mixed until the wood adhesive is needed to be used. However, the embodiments are not limited thereto.

The first agent may be a main agent. The first agent comprises sodium carboxymethyl cellulose having a molecular weight from about 15,000 to about 500,000 and a degree of substitution from about 0.4 to about 2. The term "degree of substitution" is defined as the average number of carboxymethyl group in each glucose unit. In some embodiments, the first agent may further comprise water. The first agent exists as an aqueous phase, and the sodium carboxymethyl cellulose is present in the aqueous phase. However, the embodiments are not limited thereto.

The second agent may be a curing agent. The second agent comprises polymeric quaternary amine. In some embodiments, the polymeric quaternary amine may be reacted from polyamidoamine and epichlorohydrin. Such polymeric quaternary amine comprises a unit as shown in Chemical Formula 2, wherein m is an integer.

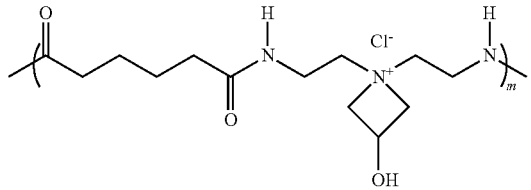

[Chemical Formula 2]

In some embodiments, the second agent may further comprise water. The second agent exists as an aqueous phase, and the polymeric quaternary amine is present in the aqueous phase. However, the embodiments are not limited thereto.

In some embodiments, the wood adhesive may further comprise various additives. For example, the wood adhesive may further comprise at least one of fillers and a flame resisting agent. The fillers may comprise at least one kind of starch and wood chips. These additives may be added into the first agent, the second agent, or the mixed wood adhesive. In some embodiments, the pH value of the wood adhesive may be changed to about 2 to about 12. For example, the pH value of the mixed wood adhesive may be changed. However, the embodiments are not limited thereto.

In the wood adhesive according to the above embodiments, the biomass material is used as the main agent. As such, the formaldehyde release problem is solved. Further, the use of the wood adhesive according to the above embodiments will not be affected by the shortage of the petrochemical materials.

In the wood adhesive according to the above embodiments, the cellulose derivative is used. Compared to the commonly used soy protein, which is the most widely used biomass material, the cellulose derivatives are more abundant in nature, and not needed to be obtained from food crops. Further, compared to the wood adhesive using the soy protein, the wood adhesive according to the above embodiments is less likely to rot and gives no soybean odor.

A method for adhering wood materials using a wood adhesive according to any one of the above embodiments may comprise providing a first wood block and a second wood block, and bonding the first wood block with the second wood block by the wood adhesive. For example, the wood adhesive may comprise a first agent and a second agent, the first agent comprises sodium carboxymethyl cellulose having a molecular weight from about 15,000 to about 500,000 and a degree of substitution from about 0.4 to about 2, and the second agent comprises polymeric quaternary amine.

More specifically, the first wood block and the second wood block may be pre-treated, such as be heated for a period of time so as to remove water, essential oils, volatile compounds and the like, and kill insect eggs. When intending to bond the first wood block with the second wood block, the first agent and the second agent may be mixed. In some embodiments, the first agent and the second agent may be mixed at a ratio from about 0.25:1 to about 1:0.1, or from about 0.7:1 to about 1:0.2. Then, the mixed wood adhesive is applied (such as by coating) to the surface(s) of the first wood block and the second wood block to be bonded. The wood adhesive may be applied to both of the surfaces to be bonded, or only one of the surfaces to be bonded. Thereafter, the wood adhesive may be cured by applying a pressure. In some embodiments, a pressure of about 10 kg/cm² may be applied at about 5° C. to 45° C. for about 10 to 30 minutes, and then a pressure of about 10 kg/cm² may be applied at about 90° C. to 230° C. for about 3 to 25 minutes. As such, the curing of the wood adhesive is accelerated.

The curing of the wood adhesive according to the embodiments is through various reaction mechanisms. One is the cross-linking of the polymeric quaternary amine itself, the product is shown in Chemical Formula 3, wherein R' is the polymeric quaternary amine.

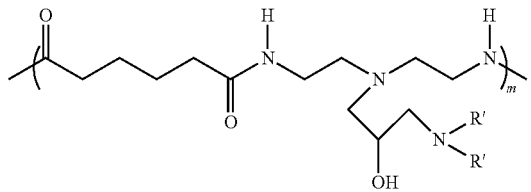

[Chemical Formula 3]

One is the reaction between the polymeric quaternary amine and the hydroxyl group of the sodium carboxymethyl cellulose, the hydroxyl group of the cellulose in the first wood block, or the hydroxyl group of the cellulose in the second wood block, to form an "—O—" connection. The product is shown in Chemical Formula 4, wherein R" is the sodium carboxymethyl cellulose, the cellulose or the like.

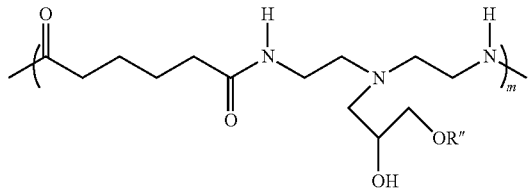

[Chemical Formula 4]

Another one is the reaction between the polymeric quaternary amine and the carboxylate anion of the sodium carboxymethyl cellulose, to form a "—COO—" connection. The product is shown in Chemical Formula 5, wherein R''' is the sodium carboxymethyl cellulose.

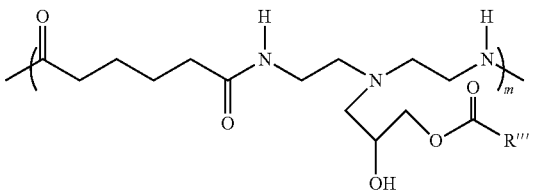

[Chemical Formula 5]

Since the wood blocks are bonded with the wood adhesive by various reaction mechanisms, a good bonding characteristic is obtained through the method for adhering wood materials according to the embodiments.

In some embodiments, at least one of the first wood block and the second wood block comprises a particleboard, an oriented strand board, a fiberboard, a plywood, a block board, or a laminate. In some embodiments, the first agent and the second agent of the wood adhesive may exist as aqueous phases. In some embodiments, the wood adhesive may further comprise various additives. For example, the wood adhesive may further comprise fillers or a flame resisting agent. In some embodiments, the wood adhesive may have a pH value from about 2 to 12, or from about 3 to 11.53.

A composite wood structure using a wood adhesive according to any one of the above embodiments may be bonded by a method for adhering wood materials according to any one of the above embodiments. According to some embodiments, a composite wood structure may comprise a first wood block, a second wood block and an adhesion layer bonding the first wood block with the second wood block. The adhesion layer is formed by mixing a first agent and a second agent of a wood adhesive according to any one of the above embodiments, and curing the wood adhesive. For example, the wood adhesive may comprise a first agent and a second agent, the first agent comprises sodium carboxymethyl cellulose having a molecular weight from about 15,000 to about 500,000 and a degree of substitution from about 0.4 to about 2, and the second agent comprises polymeric quaternary amine. The wood adhesive according to the embodiment may provide a good bonding characteristic to the composite wood structure. In some embodiments, at least one of the first wood block and the second wood block comprises a particleboard, an oriented strand board, a fiberboard, a plywood, a block board, or a laminate.

A plurality of embodiments of the wood adhesive, the method for adhering wood materials and the composite wood structure have been described. For a more clear and specific understanding to the wood adhesive, the method for adhering wood materials and the composite wood structure according to the embodiments, several examples and comparative examples are provided for detailed illustration.

Preparation of First Agent (Aqua 1)

[Sodium Carboxymethyl Cellulose Solution 1-1]

A four-neck reaction flask was provided, and 880 g of deionized water was added therein. Then, 120 g of sodium carboxymethyl cellulose (C5678, SIGMA-ALDRICH) having a molecular weight of 90,000 and a degree of substitution from 0.65 to 0.9 was added. The reaction flask was placed in an oil bath controlled at 50° C. A stirring speed of 250 rpm was applied for over 24 hours for dissolving. After cooling, a 12 wt % sodium carboxymethyl cellulose solution 1-1 (hereinafter Aqua 1-1) was obtained.

[Sodium Carboxymethyl Cellulose Solution 1-2]

A four-neck reaction flask was provided, and 937 g of deionized water was added therein. Then, 62.7 g of sodium carboxymethyl cellulose (C4888, SIGMA-ALDRICH) having a molecular weight of 250,000 and a degree of substitution of 0.7 was added. The reaction flask was placed in an oil bath controlled at 50° C. A stirring speed of 250 rpm was applied for over 24 hours for dissolving. After cooling, a 6.27 wt % sodium carboxymethyl cellulose solution 1-2 (hereinafter Aqua 1-2) was obtained.

[Sodium Carboxymethyl Cellulose Solution 1-3]

A four-neck reaction flask was provided, and 960 g of deionized water was added therein. Then, 40 g of sodium carboxymethyl cellulose (C5013, SIGMA-ALDRICH) having a molecular weight of 700,000 and a degree of substitution from 0.65 to 0.85 was added. The reaction flask was placed in an oil bath controlled at 50° C. A stirring speed of 250 rpm was applied for over 24 hours for dissolving. After cooling, a 4 wt % sodium carboxymethyl cellulose solution 1-3 (hereinafter Aqua 1-3) was obtained.

[Sodium Carboxymethyl Cellulose Solution 1-4]

A four-neck reaction flask was provided, and 900 g of deionized water was added therein. Then, 100 g of sodium carboxymethyl cellulose (PR, Dai-ichi Kogyo Seiyaku Co., Ltd.) having a molecular weight of 47,000 and a degree of substitution from 0.6 to 0.7 was added. The reaction flask was placed in an oil bath controlled at 50° C. A stirring speed of 250 rpm was applied for over 24 hours for dissolving. After cooling, a 10 wt % sodium carboxymethyl cellulose solution 1-4 (hereinafter Aqua 1-4) was obtained.

[Sodium Carboxymethyl Cellulose Solution 1-5]

A four-neck reaction flask was provided, and 880 g of deionized water was added therein. Then, 120 g of sodium carboxymethyl cellulose (7A, Dai-ichi Kogyo Seiyaku Co., Ltd.) having a molecular weight from 27,000 to 33,000 and a degree of substitution from 0.7 to 0.8 was added. The reaction flask was placed in an oil bath controlled at 50° C. A stirring speed of 250 rpm was applied for over 24 hours for dissolving. After cooling, a 12 wt % sodium carboxymethyl cellulose solution 1-5 (hereinafter Aqua 1-5) was obtained.

[Sodium Carboxymethyl Cellulose Solution 1-6]

A four-neck reaction flask was provided, and 880 g of deionized water was added therein. Then, 120 g of sodium carboxymethyl cellulose (6A, Dai-ichi Kogyo Seiyaku Co., Ltd.) having a molecular weight smaller than 27,000 and a degree of substitution from 0.7 to 0.8 was added. The reaction flask was placed in an oil bath controlled at 50° C. A stirring speed of 250 rpm was applied for over 24 hours for dissolving. After cooling, a 12 wt % sodium carboxymethyl cellulose solution 1-6 (hereinafter Aqua 1-6) was obtained.

[Sodium Carboxymethyl Cellulose Solution 1-7]

A four-neck reaction flask was provided, and 893 g of deionized water was added therein. Then, 107 g of sodium carboxymethyl cellulose (PL-15, Dai-ichi Kogyo Seiyaku Co., Ltd.) having a degree of substitution from 0.45 to 0.55 was added. The reaction flask was placed in an oil bath controlled at 50° C. A stirring speed of 250 rpm was applied for over 24 hours for dissolving. After cooling, a 10.7 wt % sodium carboxymethyl cellulose solution 1-7 (hereinafter Aqua 1-7) was obtained.

Preparation of Second Agent (Aqua 2)

Polyamidoamine-epichlorohydrin resin (Kymene®557H, Hercules) was used, hereinafter Aqua 2. It is a 12.5 wt % solution having a pH value of about 4.

Tests for the Ratio of First Agent (Aqua 1) and Second Agent (Aqua 2)

EXAMPLE 1

1.0 g of Aqua 1-1 and 3.0 g of Aqua 2 were uniformly mixed to form Wood Adhesive 1. Wood Adhesive 1 was coated between two wood sheets. The wood sheets were configured to have a 10 cm*1 cm strip shape for the following pull test using a double column pull testing machine. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature (such as 25° C.) for 24 hours, and then the bonded wood sheets were dried at the room temperature for 2 days. After drying, the pull test was carried out. The pull tests were carried out using a double column pull testing machine (Cometech Testing machines Co., Ltd.).

EXAMPLE 2

2.0 g of Aqua 1-1 and 2.0 g of Aqua 2 were uniformly mixed to form Wood Adhesive 2. Wood Adhesive 2 was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive.

As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then the bonded wood sheets were dried at the room temperature for 2 days. After drying, the pull test was carried out.

EXAMPLE 3

3.0 g of Aqua 1-1 and 1.0 g of Aqua 2 were uniformly mixed to form Wood Adhesive 3. Wood Adhesive 3 was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then the bonded wood sheets were dried at the room temperature for 2 days. After drying, the pull test was carried out.

Comparative Example 1

Aqua 2 was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then the bonded wood sheets were dried at the room temperature for 2 days. After drying, the pull test was carried out.

Comparative Example 2

Aqua 1-1 was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then the bonded wood sheets were dried at the room temperature for 2 days. After drying, the pull test was carried out.

[Test Results]

The test results of the Examples and the Comparative Examples described above were listed in Table 1. The term "percentage of biomass material" means the percentage of biomass material (at here and most of the following Examples and Comparative Examples, the biomass material is sodium carboxymethyl cellulose, and in some of the Comparative Examples, the biomass material is soy protein) in total weight. Parts of the pull test results were shown as larger than a certain value. It means that, when the pull force was at said value, the woods were broken, and thus the pull force needed to depart the adhesive cannot be measured out. No good bonding results were obtained in the case that only Aqua 1-1 was used, i.e., the second agent (polymeric quaternary amine solution) was not used, or in the case that only Aqua 2 was used, i.e., the first agent (sodium carboxymethyl cellulose solution) was not used. While good bonding results were obtained for the wood adhesives according to the Examples in a wide component ratio range. Further, even in the case being soaked for 24 hours, good bonding results were still obtained for the wood adhesives according to the Examples. That is, the wood adhesives according to the embodiments and Examples have a moisture resistance to some extent.

TABLE 1

| Composition of wood adhesive | | Percentage | Pull test results | |
| --- | --- | --- | --- | --- |
| Aqua 1-1 (g) | Aqua 2 (g) | of biomass material | Test 1 (kg/cm$^2$) | Test 2 (kg/cm$^2$) |
| Comparative Example 1 | 0 | 1 | 0 wt % | 5.46 | separate |
| Example 1 | 1 | 3 | 24 wt % | >27.8 | 30.25 |
| Example 2 | 2 | 2 | 49 wt % | >24.8 | >25.4 |
| Example 3 | 3 | 1 | 74 wt % | >23.1 | 18.9 |
| Comparative Example 2 | 1 | 0 | 100 wt % | >32 | separate |

EXAMPLE 4

2.0 g of Aqua 1-2 and 1.0 g of Aqua 2 were uniformly mixed to form Wood Adhesive 4. Wood Adhesive 4 was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then the bonded wood sheets were dried at the room temperature for 2 days. After drying, the pull test was carried out.

EXAMPLE 5

6.0 g of Aqua 1-2 and 1.0 g of Aqua 2 were uniformly mixed to form Wood Adhesive 5. Wood Adhesive 5 was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then the bonded wood sheets were dried at the room temperature for 2 days. After drying, the pull test was carried out.

Comparative Example 3

Aqua 1-2 was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then the bonded wood sheets were dried at the room temperature for 2 days. After drying, the pull test was carried out.

[Test Results]

The test results of the Examples and the Comparative Examples described above were listed in Table 2. Parts of the pull test results were shown as larger than a certain value. It means that, when the pull force was at said value, the woods were broken, and thus the pull force needed to depart the adhesive cannot be measured out. No good bonding results were obtained in the case that only Aqua 1-2 was used, i.e., the second agent (polymeric quaternary amine solution) was not used, or in the case that only Aqua 2 was used, i.e., the first agent (sodium carboxymethyl cellulose solution) was not used. While good bonding results were obtained for the wood adhesives according to the Examples in a wide component ratio range. Further, even in the case being soaked for 24 hours, good bonding results were still obtained for the wood adhesives according to the Examples. That is, the wood adhesives according to the embodiments and Examples have a moisture resistance to some extent.

TABLE 2

| | Composition of wood adhesive | | Percentage | Pull test | |
|---|---|---|---|---|---|
| | Aqua 1-2 (g) | Aqua 2 (g) | of biomass material | Test 1 (kg/cm$^2$) | Test 2 (kg/cm$^2$) |
| Comparative Example 1 | 0 | 1 | 0 wt % | 5.46 | separate |
| Example 4 | 2 | 1 | 50 wt % | 21.46 | >25 |
| Example 5 | 6 | 1 | 74 wt % | >12 | >15.45 |
| Comparative Example 3 | 1 | 0 | 100 wt % | >25.4 | separate |

Tests for the pH Value of Wood Adhesive

EXAMPLE 6

15.0 g of Aqua 1-1, 5.0 g of Aqua 2 and 0.88 g of a HCl solution (a dilute solution in which concentrated hydrochloric acid is 18.5 wt %, hereinafter $HCl_{(aq)}$) were uniformly mixed to form Wood Adhesive 6. Wood Adhesive 6 was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value and the pot life at 25° C. of Wood Adhesive 6 were measured. The pH value was measured using a pH meter (pH meter 6250, JENCO electronics). In the measurement of pot life, the viscosity of Wood Adhesive 6 was measured at 30 minutes after mixing and 5 hours after mixing, respectively, using Spindle 28 of a viscometer (DV-III, BROOK Field) at 30 rpm, and then the change of the viscosity was calculated.

EXAMPLE 7

15.0 g of Aqua 1-1, 5.0 g of Aqua 2 and 0.385 of a $HCl_{(aq)}$ were uniformly mixed to form Wood Adhesive 7. Wood Adhesive 7 was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value and the pot life at 25° C. of Wood Adhesive 7 were measured. The pH value was measured using the pH meter. In the measurement of pot life, the viscosity of Wood Adhesive 7 was measured at 30 minutes after mixing and 5 hours after mixing, respectively, using Spindle 29 of the viscometer at 60 rpm, and then the change of the viscosity was calculated.

EXAMPLE 8

15.0 g of Aqua 1-1 and 5.0 g of Aqua 2 were uniformly mixed to form Wood Adhesive 8. Wood Adhesive 8 was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value and the pot life at 25° C. of Wood Adhesive 8 were measured. The pH value was measured using the pH meter. In the measurement of pot life, the viscosity of Wood Adhesive 8 was measured at 30 minutes after mixing and 5 hours after mixing, respectively, using Spindle 28 of the viscometer at 30 rpm, and then the change of the viscosity was calculated.

EXAMPLE 9

15.0 g of Aqua 1-1, 5.0 g of Aqua 2 and 0.206 g of a NaOH solution (a dilute solution in which concentrated sodium hydroxide solution is 10 wt %, hereinafter $NaOH_{(aq)}$) were uniformly mixed to form Wood Adhesive 9. Wood Adhesive 9 was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value and the pot life at 25° C. of Wood Adhesive 9 were measured. The pH value was measured using the pH meter. In the measurement of pot life, the viscosity of Wood Adhesive 9 was measured at 30 minutes after mixing and 5 hours after mixing, respectively, using Spindle 28 of the viscometer at 30 rpm, and then the change of the viscosity was calculated.

EXAMPLE 10

15.0 g of Aqua 1-1, 5.0 g of Aqua 2 and 0.5 g of NaOH$_{(aq)}$ were uniformly mixed to form Wood Adhesive 10. Wood Adhesive 10 was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value and the pot life at 25° C. of Wood Adhesive 10 were measured. The pH value was measured using the pH meter. In the measurement of pot life, the viscosity of Wood Adhesive 10 was measured at 30 minutes after mixing and 5 hours after mixing, respectively, using Spindle 28 of the viscometer at 30 rpm, and then the change of the viscosity was calculated.

EXAMPLE 11

15.0 g of Aqua 1-1, 5.0 g of Aqua 2 and 0.69 g of NaOH$_{(aq)}$ were uniformly mixed to form Wood Adhesive 11. Wood Adhesive 11 was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value and the pot life at 25° C. of Wood Adhesive 11 were measured. The pH value was measured using the pH meter. In the measurement of pot life, the viscosity of Wood Adhesive 11 was measured at 30 minutes after mixing and 5 hours after mixing, respectively, using Spindle 29 of the viscometer at 60 rpm, and then the change of the viscosity was calculated.

EXAMPLE 12

15.0 g of Aqua 1-1, 5.0 g of Aqua 2 and 1.039 g of NaOH$_{(aq)}$ were uniformly mixed to form Wood Adhesive 12. Wood Adhesive 12 was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value and the pot life at 25° C. of Wood Adhesive 12 were measured. The pH value was measured using the pH meter. In the measurement of pot life, the viscosity of Wood Adhesive 12 was measured at 30 minutes after mixing and 5 hours after mixing, respectively, using Spindle 28 of the viscometer at 30 rpm, and then the change of the viscosity was calculated.

EXAMPLE 13

15.0 g of Aqua 1-1, 5.0 g of Aqua 2 and 1.5 g of NaOH$_{(aq)}$ were uniformly mixed to form Wood Adhesive 13. Wood Adhesive 13 was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value and the pot life at 25° C. of Wood Adhesive 13 were measured. The pH value was measured using the pH meter. In the measurement of pot life, the viscosity of Wood Adhesive 13 was measured at 30 minutes after mixing and 5 hours after mixing, respectively, using Spindle 29 of the viscometer at 60 rpm, and then the change of the viscosity was calculated.

Comparative Example 4

15.0 g of Aqua 1-1, 5.0 g of Aqua 2 and 2 g of HCl$_{(aq)}$ were uniformly mixed to form a comparative wood adhesive. The comparative wood adhesive was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value of the comparative wood adhesive was measured. The pH value was measured using the pH meter. The pot life of this comparative wood adhesive was not measured due to phase separation.

Comparative Example 5

15.0 g of Aqua 1-1, 5.0 g of Aqua 2 and 2.54 g of NaOH$_{(aq)}$ were uniformly mixed to form a comparative wood adhesive. The comparative wood adhesive was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value and the pot life at 25° C. of the comparative wood adhesive were measured. The pH value was measured using the pH meter. In the measurement of pot life, the viscosity of the comparative wood adhesive was measured at 30 minutes after mixing and 5 hours after mixing, respectively, using Spindle 29 of the viscometer at 60 rpm, and then the change of the viscosity was calculated.

[Test Results]

The test results of the Examples and the Comparative Examples described above were listed in Table 3. Only ranges for the results of pot life and pull test were shown due to sample deviation. The results of the pot life is very good for lower than or equal to 50%, good for higher than 50% while lower than 100%, usable for higher than or equal to 100%. The user may choose anyone according to his or her need. However, the ones having a pot life higher than 200% are not suitable for use. The results of the pull test is very good for higher than or equal to 15 kg/cm$^2$, good for lower than 15 kg/cm$^2$ while higher than 8 kg/cm$^2$, usable for lower than or equal to 8 kg/cm$^2$ while higher than 3 kg/cm$^2$. The user may choose anyone according to his or her need. However, the ones having a pull test result lower than or equal to 3 kg/cm$^2$ are not suitable for use. No good bonding results were obtained in the case too acidic or too basic. While good bonding results were obtained for the wood adhesives according to the Examples in a wide pH range, in particular good for pH value in a range from about 2 to about 12. Further, even in the case being soaked for 24 hours, good bonding results were still obtained for the wood adhesives according to the Examples.

The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value and the pot life at 25° C. of Wood Adhesive 14 were measured. The pH value was measured using the pH meter. In the measurement of pot life, the viscosity of Wood Adhesive 14 was measured at 30 minutes after mixing and 5 hours after mixing, respectively, using Spindle 28 of the viscometer at 15 rpm, and then the change of the viscosity was calculated.

EXAMPLE 15

15.0 g of Aqua 1-1, 5.0 g of Aqua 2 and 0.5 g of NaOH$_{(aq)}$ were uniformly mixed to form Wood Adhesive 15. Wood Adhesive 15 was coated between two wood sheets. The wood sheets were configured to have a 10 cm*1 cm strip shape for the following pull test. The coated area was 1 cm$^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood

TABLE 3

| | Composition of wood adhesive | | | Percentage | | Pot life | | | Pull test | |
|---|---|---|---|---|---|---|---|---|---|---|
| | Aqua 1-1 (g) | Aqua 2 (g) | HCl$_{(aq)}$/ NaOH$_{(aq)}$ (g) | of biomass material | pH value | Result of 30 min (cps) | Result of 5 hr (cps) | Pot life (%) | Test 1 (kg/cm$^2$) | Test 2 (kg/cm$^2$) |
| Comparative Example 4 | 15 | 5 | 2 | 74 wt % | 1.01 | — | — | — | ≤3 | ≤3 |
| Example 6 | 15 | 5 | 0.88 | 74 wt % | 2.87 | 20903 | 38108 | 82 | 8 to 15 | 3 to 8 |
| Example 7 | 15 | 5 | 0.385 | 74 wt % | 3.81 | 16200 | 20000 | 23 | 8 to 15 | 8 to 15 |
| Example 8 | 15 | 5 | — | 74 wt % | 5.3 | 17633 | 28900 | 63 | ≥15 | 8 to 15 |
| Example 9 | 15 | 5 | 0.206 | 74 wt % | 6.85 | 14067 | 22000 | 26 | ≥15 | 8 to 15 |
| Example 10 | 15 | 5 | 0.5 | 74 wt % | 8.06 | 13100 | 15200 | 16 | ≥15 | 8 to 15 |
| Example 11 | 15 | 5 | 0.69 | 74 wt % | 9.57 | 10300 | 12400 | 20 | ≥15 | 8 to 15 |
| Example 12 | 15 | 5 | 1.039 | 74 wt % | 11.53 | 9113 | 12067 | 32 | ≥15 | 8 to 15 |
| Example 13 | 15 | 5 | 1.5 | 74 wt % | 11.96 | 5867 | 10000 | 70 | ≥15 | 3 to 8 |
| Comparative Example 5 | 15 | 5 | 2.539 | 74 wt % | 12.08 | 2475 | 5200 | 220 | ≥15 | ≤3 |

Tests for Molecular Weight and Degree of Substitution of Sodium Carboxymethyl Cellulose of First Agent (Aqua 1)

EXAMPLE 14

30.0 g of Aqua 1-2, 5.0 g of Aqua 2 and 0.5 g of NaOH$_{(aq)}$ were uniformly mixed to form Wood Adhesive 14. Wood Adhesive 14 was coated between two wood sheets. The wood sheets were configured to have a 10 cm*1 cm strip shape for the following pull test. The coated area was 1 cm$^2$.

sheets were soaked in water at room temperature for 24 hours, and then a pull test was carried out without drying. Further, after the two agents were mixed, the pH value and the pot life at 25° C. of Wood Adhesive 15 were measured. The pH value was measured using the pH meter. In the measurement of pot life, the viscosity of Wood Adhesive 15 was measured at 30 minutes after mixing and 5 hours after mixing, respectively, using Spindle 28 of the viscometer at 30 rpm, and then the change of the viscosity was calculated.

EXAMPLE 16

18.75 g of Aqua 1-4, 5.0 g of Aqua 2 and 0.5 g of $NaOH_{(aq)}$ were uniformly mixed to form Wood Adhesive 16. Wood Adhesive 16 was coated between two wood sheets. The wood sheets were configured to have a 10 cm*1 cm strip shape for the following pull test. The coated area was 1 $cm^2$. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value and the pot life at 25° C. of Wood Adhesive 16 were measured. The pH value was measured using the pH meter. In the measurement of pot life, the viscosity of Wood Adhesive 16 was measured at 30 minutes after mixing and 5 hours after mixing, respectively, using Spindle 28 of the viscometer at 30 rpm, and then the change of the viscosity was calculated.

EXAMPLE 17

15.0 g of Aqua 1-5, 5.0 g of Aqua 2 and 0.5 g of $NaOH_{(aq)}$ were uniformly mixed to form Wood Adhesive 17. Wood Adhesive 17 was coated between two wood sheets. The wood sheets were configured to have a 10 cm*1 cm strip shape for the following pull test. The coated area was 1 cm2. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value and the pot life at 25° C. of Wood Adhesive 17 were measured. The pH value was measured using the pH meter. In the measurement of pot life, the viscosity of Wood Adhesive 17 was measured at 30 minutes after mixing and 5 hours after mixing, respectively, using Spindle 28 of the viscometer at 60 rpm, and then the change of the viscosity was calculated.

EXAMPLE 18

15.0 g of Aqua 1-6, 5.0 g of Aqua 2 and 0.5 g of $NaOH_{(aq)}$ were uniformly mixed to form Wood Adhesive 18. Wood Adhesive 18 was coated between two wood sheets. The wood sheets were configured to have a 10 cm*1 cm strip shape for the following pull test. The coated area was 1 cm2. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value and the pot life at 25° C. of Wood Adhesive 18 were measured. The pH value was measured using the pH meter. In the measurement of pot life, the viscosity of Wood Adhesive 18 was measured at 30 minutes after mixing and 5 hours after mixing, respectively, using Spindle 29 of the viscometer at 100 rpm, and then the change of the viscosity was calculated.

EXAMPLE 19

16.8 g of Aqua 1-7, 5.0 g of Aqua 2 and 0.5 g of $NaOH_{(aq)}$ were uniformly mixed to form Wood Adhesive 19. Wood Adhesive 19 was coated between two wood sheets. The wood sheets were configured to have a 10 cm*1 cm strip shape for the following pull test. The coated area was 1 cm2. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value and the pot life at 25° C. of Wood Adhesive 19 were measured. The pH value was measured using the pH meter. In the measurement of pot life, the viscosity of Wood Adhesive 19 was measured at 30 minutes after mixing and 5 hours after mixing, respectively, using Spindle 29 of the viscometer at 60 rpm, and then the change of the viscosity was calculated.

Comparative Example 6

45.0 g of Aqua 1-3, 5.0 g of Aqua 2 and 0.5 g of $NaOH_{(aq)}$ were uniformly mixed to form a comparative wood adhesive. The comparative wood adhesive was coated between two wood sheets. The wood sheets were configured to have a 10 cm*1 cm strip shape for the following pull test. The coated area was 1 cm2. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value and the pot life at 25° C. of the comparative wood adhesive were measured. The pH value was measured using the pH meter. In the measurement of pot life, the viscosity of the comparative wood adhesive was measured at 30 minutes after mixing and 5 hours after mixing, respectively, using Spindle 29 of the viscometer at 40 rpm, and then the change of the viscosity was calculated.

Comparative Example 7

Preparing a 26 wt % soy protein solution using soy protein (Dupont® Soy polymer, LVH). 7.5 g of the soy protein solution, 5.0 g of Aqua 2 and 0.5 g of $NaOH_{(aq)}$ were uniformly mixed to form a comparative wood adhesive. The comparative wood adhesive was coated between two wood sheets. The wood sheets were configured to have a 10 cm*1 cm strip shape for the following pull test. The coated area was 1 cm2. The wood sheets were overlapped, and a pressure of 200 psi was applied at 120° C. for 20 minutes to cure the wood adhesive. As such, the wood sheets were attached to each other. Two tests were carried out for the bonded wood sheets. In Test 1, a pull test was carried out right after the attachment of the wood sheets. In Test 2, the bonded wood sheets were soaked in water at room temperature for 24 hours, and then a pull test was carried out without drying. Further, after the two agents were mixed, the pH value and the pot life at 25° C. of the comparative wood adhesive were measured. The pH value was measured using the pH meter. In the measurement of pot life, the viscosity of the comparative wood adhesive was measured at 30 minutes after mixing and 5 hours after mixing, respectively, using Spindle 29 of the viscometer at 40 rpm, and then the change of the viscosity was calculated.

[Test Results]

The test results of the Examples and the Comparative Examples described above were listed in Table 4. Only ranges for the results of pot life and pull test were shown due to sample deviation. The results of the pot life is very good for lower than or equal to 50%, good for higher than 50% while lower than 100%, usable for higher than or equal to 100%. The user may choose anyone according to his or her need. However, the ones having a pot life higher than 200% are not suitable for use. The results of the pull test is very good for higher than or equal to 15 kg/cm², good for lower than 15 kg/cm² while higher than 8 kg/cm², usable for lower than or equal to 8 kg/cm² while higher than 3 kg/cm². The user may choose anyone according to his or her need. However, the ones having a pull test result lower than or equal to 3 kg/cm² are not suitable for use. Good bonding results were obtained for the wood adhesives according to the Examples in a wide molecular weight range and a wide degree-of-substitution range. In particular, it is good to have a molecular weight from about 15,000 to about 250,000 and a degree of substitution higher than 0.4. Further, even in the case being soaked for 24 hours, good bonding results were still obtained for the wood adhesives according to the Examples. The wood adhesive using the soy protein were listed as a comparative example (Comparative Example 7). The wood adhesive according to the Examples is competitive to the wood adhesive using the soy protein.

embodiments, compared to the commonly used soy protein, the wood adhesive according to embodiments is less likely to rot and gives no soybean odor. Further, the wood adhesive according to embodiments has a good moisture resistance and a good bonding effect.

The composite wood structure using said wood adhesive is less likely to rot and gives no soybean odor. Further, the composite wood structure has a good moisture resistance and a good bonding effect.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for adhering wood materials, comprising:
providing a first wood block and a second wood block; and
bonding the first wood block with the second wood block by a wood adhesive, wherein the wood adhesive comprises a first agent and a second agent, the first agent comprises sodium carboxymethyl cellulose having a molecular weight from 15,000 to 500,000 and a degree of substitution from 0.4 to 2, and the second agent comprises polymeric quaternary amine, wherein the bonding the first wood block with the second wood block step comprises mixing the first agent and the second agent.

2. The method according to claim 1, wherein the bonding the first wood block with the second wood block step further comprises:
applying the wood adhesive to at least one of the first wood block and the second wood block; and
curing the wood adhesive.

TABLE 4

| | Composition of wood adhesive | | | Percentage of biomass material | pH value | Pot life | | | Pull test | |
|---|---|---|---|---|---|---|---|---|---|---|
| | Aqua 1 (g) | Aqua 2 (g) | NaOH$_{(aq)}$ (g) | | | Result of 30 min (cps) | Result of 5 hr (cps) | Pot life (%) | Test 1 (kg/cm²) | Test 2 (kg/cm²) |
| Comparative Example 6 | 45 | 5 | 0.5 | 74 wt % | 8 to 10 | 37500 | 340000 | 806 | ≥15 | 8 to 15 |
| Example 14 | 30 | 5 | 0.5 | 74 wt % | | 52100 | 92000 | 76 | ≥15 | 8 to 15 |
| Example 15 | 15 | 5 | 0.5 | 74 wt % | | 13100 | 15200 | 16 | ≥15 | 8 to 15 |
| Example 16 | 18.75 | 5 | 0.5 | 74 wt % | | 16167 | 27500 | 70 | ≥15 | 8 to 15 |
| Example 17 | 15 | 5 | 0.5 | 74 wt % | | 2033 | 2350 | 15 | ≥15 | 8 to 15 |
| Example 18 | 15 | 5 | 0.5 | 74 wt % | | 240 | 260 | 8 | ≥15 | 3 to 8 |
| Example 19 | 16.8 | 5 | 0.5 | 74 wt % | | 10100 | 12500 | 23 | ≥15 | 3 to 8 |
| Comparative Example 7 | 7.5 | 5 | 0.5 | 74 wt % | | 5200 | 6200 | 25 | ≥15 | 3 to 8 |

In summary, since the biomass material is used as the main agent in the wood adhesive according to embodiments, the formaldehyde release problem is solved, and the use of the wood adhesive will not be affected by the shortage of the petrochemical materials. In addition, since the cellulose derivative is used in the wood adhesive according to 3. The method according to claim 2, wherein the first agent and the second agent is mixed at a ratio from 0.25:1 to 1:0.1.

4. The method according to claim 2, wherein the first agent and the second agent is mixed at a ratio from 0.7:1 to 1:0.2.

5. The method according to claim 2, wherein the curing the wood adhesive step comprises applying a pressure of 10 kg/cm² at 5° C. to 45° C. for 10 minutes to 30 minutes.

6. The method according to claim 5, wherein the curing the wood adhesive step further comprises applying a pressure of 10 kg/cm² at 90° C. to 230° C. for 3 minutes to 25 minutes.

7. The method according to claim 1, further comprising pre-treating the first wood block and the second wood block.

8. The method according to claim 7, wherein the pre-treating the first wood block and the second wood block step comprises heating.

9. A composite wood structure, comprising:
 a first wood block;
 a second wood block; and
 an adhesion layer bonding the first wood block with the second wood block, the adhesion layer is formed by mixing a first agent and a second agent of a wood adhesive and curing the wood adhesive, wherein the first agent of the wood adhesive comprises sodium carboxymethyl cellulose having a molecular weight from 15,000 to 500,000 and a degree of substitution from 0.4 to 2, and the second agent of the wood adhesive comprises polymeric quaternary amine.

10. The composite wood structure according to claim 9, wherein at least one of the first wood block and the second wood block comprises a particleboard, an oriented strand board, a fiberboard, a plywood, a block board, or a laminate.

* * * * *